United States Patent
Tasdizen et al.

(10) Patent No.: US 11,082,628 B2
(45) Date of Patent: Aug. 3, 2021

(54) METHOD OF FLICKER REDUCTION

(71) Applicants: Apical Ltd, Cambridge (GB); ARM Limited, Cambridge (GB)

(72) Inventors: Ozgur Tasdizen, Cambridge (GB); Alexey Kornienko, Loughborough (GB)

(73) Assignees: Apical Ltd, Cambridge (GB); ARM Limited, Cambridge (GB)

( * ) Notice: Subject to any disclaimer, the term of this patent is extended or adjusted under 35 U.S.C. 154(b) by 0 days.

(21) Appl. No.: 16/206,306

(22) Filed: Nov. 30, 2018

(65) Prior Publication Data
US 2019/0166298 A1  May 30, 2019

(30) Foreign Application Priority Data
Nov. 30, 2017  (GB) ..................... 1720000

(51) Int. Cl.
*H04N 5/235* (2006.01)
*H04N 5/14* (2006.01)
*H04N 7/01* (2006.01)
*H04N 21/2368* (2011.01)
(Continued)

(52) U.S. Cl.
CPC ........... *H04N 5/2357* (2013.01); *H04N 5/144* (2013.01); *H04N 5/3532* (2013.01); *H04N 7/0132* (2013.01); *H04N 21/2368* (2013.01)

(58) Field of Classification Search
CPC .. H04N 5/2357; H04N 5/3532; H04N 7/0132; H04N 5/144; H04N 21/2368
See application file for complete search history.

(56) References Cited

U.S. PATENT DOCUMENTS

| | | | | |
|---|---|---|---|---|
| 7,675,552 B2* | 3/2010 | Ono | .................. | H04N 5/235 |
| | | | | 348/228.1 |
| 8,890,975 B2* | 11/2014 | Baba | .................. | H04N 5/2357 |
| | | | | 348/226.1 |
| 9,232,153 B2* | 1/2016 | Elhachimi | .............. | H04N 5/265 |

(Continued)

FOREIGN PATENT DOCUMENTS

| | | |
|---|---|---|
| CN | 1863277 A | 11/2006 |
| CN | 1929562 A | 3/2007 |

(Continued)

OTHER PUBLICATIONS

Yoonjong Yoo, et al.: "Flicker removal for CMOS wide dynamic range imaging based on alternating current component analysis" IEEE Transactions on Consumer Electronics, vol. 60, No. 3, Aug. 2014.

(Continued)

*Primary Examiner* — Ahmed A Berhan
(74) *Attorney, Agent, or Firm* — EIP US LLP

(57) ABSTRACT

Examples of the present disclosure relate to a method for reducing artefacts caused by the presence of flicker during capture of a video. A sequence of frames of the video are captured, the frames each comprising a plurality of predefined regions each comprising a plurality of pixels. A time-varying oscillation of the flicker is characterized based on variations, across the sequence of frames, of data relating to pixel intensities in at least one said region. Based on the characterizing of the time-varying oscillation of the flicker, a flicker correction is applied to a frame of the video.

17 Claims, 14 Drawing Sheets

(51) Int. Cl.
*H04N 5/359* (2011.01)
*H04N 5/353* (2011.01)

(56) References Cited

U.S. PATENT DOCUMENTS

| | | | |
|---|---|---|---|
| 9,591,230 B2* | 3/2017 | Jiao | H04N 5/2351 |
| 2008/0101721 A1 | 5/2008 | Mori | |
| 2009/0135276 A1 | 5/2009 | Urisaka | |
| 2010/0026820 A1* | 2/2010 | Senoo | H04N 5/353 348/208.7 |
| 2015/0103209 A1 | 4/2015 | Elhachimi et al. | |
| 2015/0195487 A1* | 7/2015 | Liu | H04N 5/21 348/447 |
| 2017/0374263 A1* | 12/2017 | Somayaji | H04N 5/2355 |

FOREIGN PATENT DOCUMENTS

| | | |
|---|---|---|
| CN | 1992818 A | 7/2007 |
| CN | 1437389 A | 8/2008 |
| CN | 101366271 A | 1/2009 |
| CN | 101472059 A | 7/2009 |
| CN | 102356631 A | 2/2012 |
| CN | 103583035 A | 2/2014 |
| CN | 104380710 A | 2/2015 |
| CN | 104780358 A | 7/2015 |
| CN | 106063251 A | 10/2016 |
| CN | 106572345 A | 4/2017 |
| CN | 106973239 A | 7/2017 |
| EP | 2262228 A1 | 12/2010 |

OTHER PUBLICATIONS

Dwight Poplin: "An automatic flicker detection method for embedded camera systems", IEEE Transactions on Consumer Electronics, vol. 52, No. 2, May 2006.
Combined Search and Examination Report dated May 28, 2018 for GB Application No. GB1720000.7.
Chinese Office Action dated Jun. 1, 2021 for Chinese Application No. 201811491371.9.

* cited by examiner

METHOD OF FLICKER REDUCTION

CROSS-REFERENCE TO RELATED APPLICATIONS

This application claims priority to GB Application No. GB1720000.7, filed Nov. 30, 2017, under 35 U.S.C. § 119(a). The above-referenced patent application is incorporated by reference in its entirety.

BACKGROUND OF THE INVENTION

Field of the Invention

The present invention relates to methods, apparatus and computer readable storage media for reducing artefacts caused by the presence of flicker during image capture.

Description of the Related Technology

Certain known light sources do not produce a constant light intensity, but instead flicker. Such flickering is a periodic varying in intensity between a minimum intensity, such as zero intensity, and a maximum intensity. The time dependence of the intensity can have various shapes, such as a step function or a sinusoid.

Flicker can be a consequence of the light source being powered by alternating current, such as a sinusoidally varying current with a frequency of 50 Hz or 60 Hz. Electrical power varies as the square of the current, and thus flicker arising from an alternating current has a frequency of double the current frequency. For example, a flicker arising from a 50 Hz current would have a frequency of 100 Hz.

Flicker can be intentionally induced, for example to reduce the overall perceived intensity of a light source. As an example, a light emitting diode (LED) can be cycled between an "on" state and an "off state". If this cycling has a frequency faster than around 100 Hz, it will typically not be perceived as flicker by a human observer but will instead be perceived as a constant intensity lower than that corresponding to the "on" state. LED light fixtures, such as LED street lamps, typically perform such cycling to achieve a desired overall light intensity.

When a video is captured in the presence of a flickering light source, artefacts may be produced in captured video frames. For example, videos may be captured using a "rolling shutter" method, in which each video frame is captured by scanning vertically or horizontally across the scene in a line-by-line fashion. Each line is thus captured at a different time, and consequently a different phase of an oscillating flicker. The brightness of the captured scene thus varies across the frame, which can lead to "banding" artefacts.

Flicker artefacts such as these described above can be visible in the captured video even when the flickering itself is sufficiently fast as to not be observable by a human. This reduces the quality of the captured video as perceived by a human observer. Flicker artefacts also present problems for computer processing of the captured video. For example, where the captured video is used to navigate an automated vehicle, the flicker artefacts may compromise the navigation. There is thus a need for methods to reduce flicker artefacts in a captured video.

SUMMARY

According to an aspect of the present invention, there is provided a method for reducing artefacts caused by the presence of flicker during capture of a video, the method comprising: capturing a sequence of frames of the video, the frames each comprising a plurality of predefined regions each comprising a plurality of pixels; characterizing a time-varying oscillation of the flicker based on variations, across the sequence of frames, of data relating to pixel intensities in at least one said region; and based on the characterizing of the time-varying oscillation of the flicker, applying a flicker correction to a frame of the video.

According to a further aspect, there is provided an apparatus for reducing artefacts caused by the presence of flicker during capture of a video, the apparatus comprising: a receiving module to capture a sequence of frames of the video, the frames each comprising a plurality of predefined regions each comprising a plurality of pixels; a characterization module to characterize a time-varying oscillation of the flicker based on variations, across the sequence of frames, of data relating to pixel intensities in at least one said region; and a flicker correction module to, based on the characterizing of the time-varying oscillation of the flicker, apply a flicker correction to a frame the video.

According to a further aspect, there is provided a non-transitory computer-readable storage medium comprising a set of computer-readable instructions stored thereon which, when executed by at least one processor, cause the at least one processor to: capture a sequence of frames of a video, the frames each comprising a plurality of predefined regions each comprising a plurality of pixels; characterize a time-varying oscillation of flicker present during capture of the video, the characterizing being based on variations, across the sequence of frames, of data relating to pixel intensities in at least one said region; and based on the characterizing of the time-varying oscillation of the flicker, apply a flicker correction to a frame of the video.

DETAILED DESCRIPTION OF CERTAIN INVENTIVE EMBODIMENTS

Figure 1:
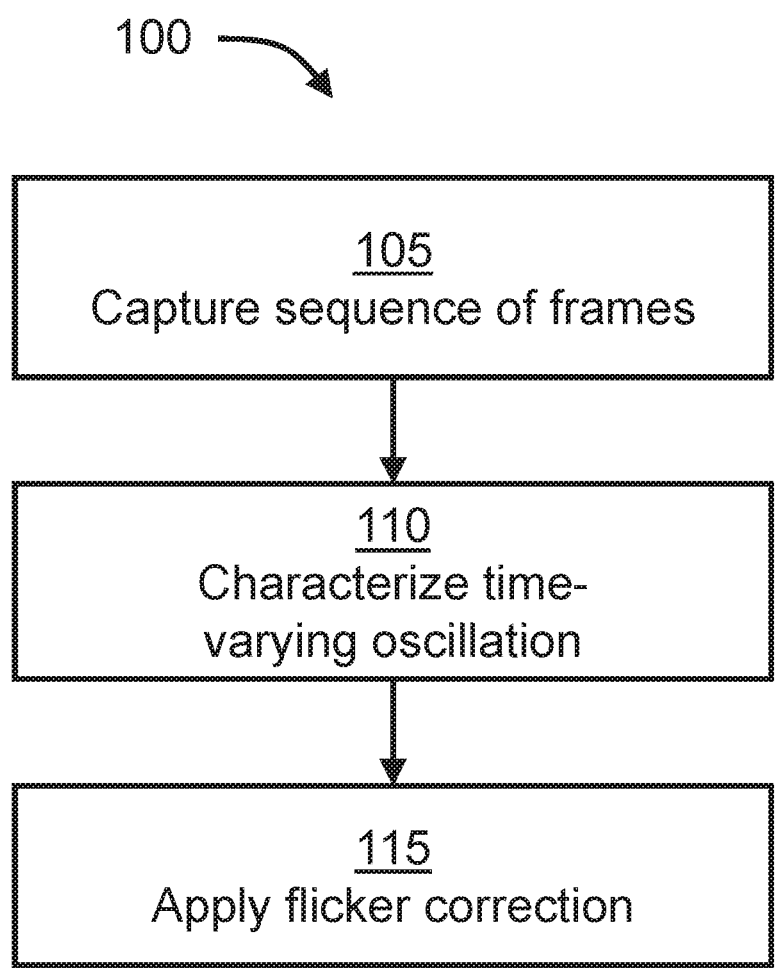
FIG. 1 shows schematically a method according to an example.

FIG. 1 shows a schematic representation of a method 100 for reducing artefacts caused by the presence of flicker during image capture.

The method 100 comprises a step 105 of capturing a sequence of frames of the video. The frames each comprise a plurality of predefined regions. Each region comprises a plurality of pixels.

The method 100 comprises a step 110 of characterizing a time-varying oscillation of the flicker based on variations, across the sequence of frames, of data relating to pixel intensities in at least one said region.

The method 100 comprises a step 115 of, based on the characterizing of the time-varying oscillation of the flicker, applying a flicker correction to a frame of the video. Flicker artefacts can thus be reduced relative to systems in which such flicker correction is not performed, thereby improving the perceived quality of the video. The suitability of the video for computer processing, for example to navigate an automated vehicle as described above, is also improved relative to systems in which no such flicker correction is performed.

Some flicker correction methods comprise changing of the times at which frames are captured, in order to capture frames in synchronism with the oscillation of the flicker. The present method allows flicker correction without such changing of the times at which frames are captured. The present method thus allows flicker correction in situations in which such changing of the times at which frames are captured is not possible, for example recording video with high frame rates such as those exceeding 240 frames per second. High frame rates such as this lead to multiple frames being captured across a single oscillation of the flicker. The frame capture times can thus not be distributed to always be at the same phase of the flicker.

In some examples, the flicker correction is disabled when an input is received indicating that no flicker is present. An example of such an input is an indication, either based on automatic sensing or from a user, that properties of the lighting are inconsistent with flicker, for example if the white balance is consistent with a non-flickering light source such as daylight or incandescent lighting.

An example of the origin of "banding" flicker artefacts will now be described with reference to FIGS. 2A and 2B.

Figure 2A:
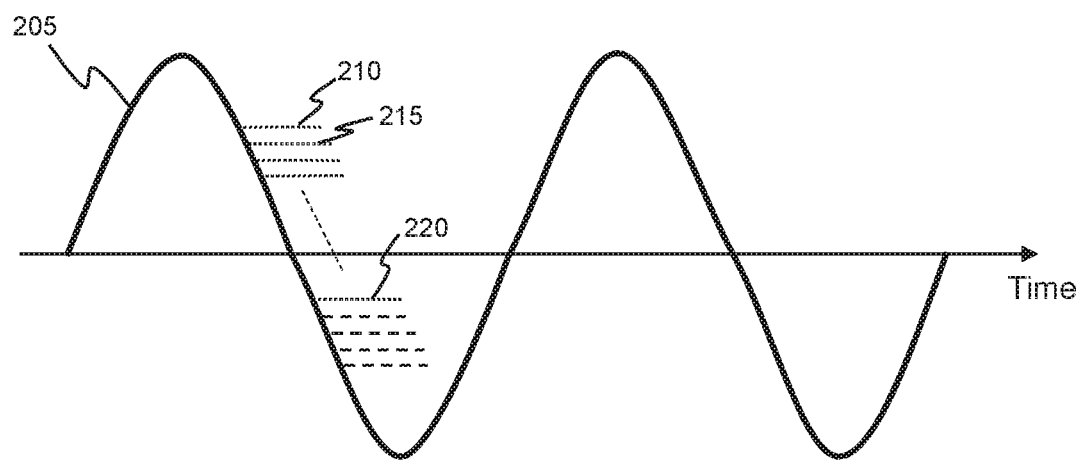
FIGS. 2A and 2B show an origin of flicker artefacts in video frames.

FIG. 2A shows schematically a sinusoidally varying flicker intensity 205. A video is captured using a rolling shutter technique, wherein subsequent lines of pixels including a first line 210, a second line 215, further lines and a final line 220 are captured at different phases of the flicker sinusoid 205. The lines are combined to form a first frame of the video. The lines of pixels are then captured again starting from the first line, represented in dashed lines in FIG. 2A, to form a second frame of the video. The second frame is thus captured in darker lighting conditions than the first frame, and may therefore be overall darker than the first frame.

Figure 2B:
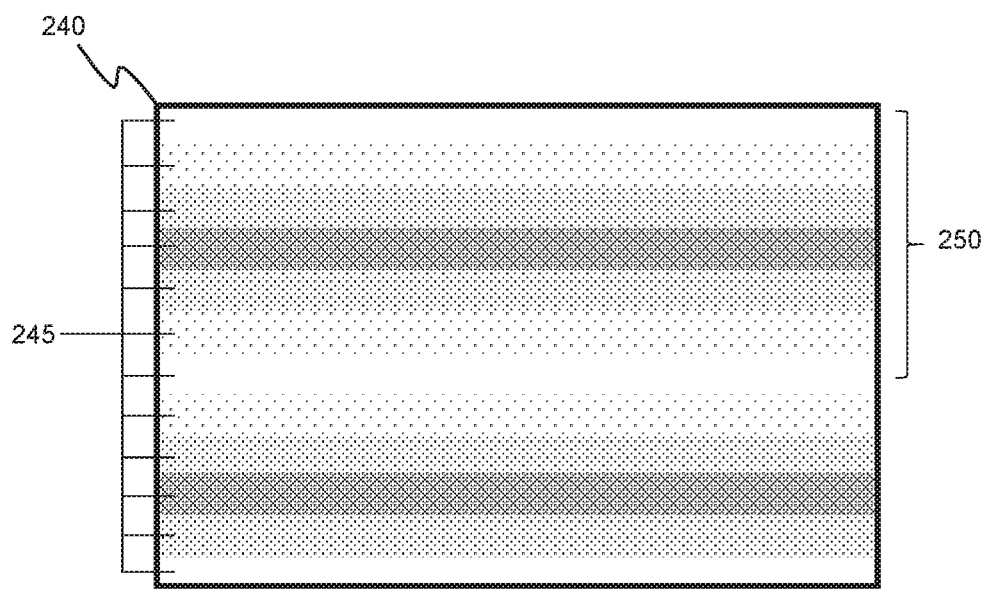

FIG. 2B shows schematically a frame 240, captured in the presence of a flickering light source using a vertically rolling shutter. The frame 240 comprises twelve lines 245 of pixels. In this example, the lines 245 are horizontal rows because the rolling shutter was a vertical rolling shutter. Conversely, if a horizontally rolling shutter was used, the lines 245 would be vertical columns.

The capture interval of the frame 240 corresponds approximately to two periods of the flicker oscillation. As a consequence of the rolling shutter, the pixels of a given line 245 are captured simultaneously and thus at the same phase of the flicker. Consequently, the pixels of a given line 245 are captured under lighting of the same brightness. In some examples in which the video is captured using a rolling shutter, each predetermined region mentioned above in relation to the method 100 of FIG. 1 comprises such a line of pixels.

Subsequent lines 245 are captured at different phases of the flicker. The line intensity thus varies over a vertical distance 250 corresponding to a complete oscillation of the flicker. In the example of FIG. 2B, the first line has a maximum intensity corresponding to a maximum brightness of the flicker. The intensity decreases in subsequent lines, until a minimum intensity is reached, corresponding to a minimum brightness of the flicker. The intensity then increases line-by-line until the maximum intensity is reached. This cycle repeats over the frame 240, causing banding artefacts in the frame 240.

The degree of banding can depend on the interaction of different light sources. For example, a portion of the scene near a flickering light source may exhibit flicker, while a portion of the scene near a non-flickering light source may not exhibit flicker.

A sinusoidally oscillating flicker 205 can be characterized by parameters such as amplitude, phase and frequency. In examples, the step in the method 100 of characterizing the time-varying oscillation of the flicker comprises determining at least one of an amplitude and phase of the flicker.

Alternatively or additionally, the method 100 may comprise determining a frequency of the flicker. The characterizing of the time-varying oscillation of the flicker can then be based on the determined frequency. A flickering light source may flicker at a frequency equal to the frequency of a local mains alternating current electricity supply. This mains supply frequency is region specific, being equal for example to 50 Hz in Europe and 60 Hz in the USA. The determining of the frequency of the flicker may thus be based on a geographical location at which the video was captured, for example identified by location metadata associated with the video. In such examples, the amplitude and/or phase can then be determined by analyzing the flicker artefacts in frames of the video, examples of which are described in more detail below.

The appearance of the banding artefacts described above depends on the layout of objects within the scene: while regions of a frame corresponding to flat objects may exhibit a clear banding pattern such as that shown in FIG. 2B, local tone variations on objects with more complex texture may lead to more complicated distributions of pixel brightness. In order to improve the accuracy of the characterization of the flicker oscillation, the data relating to pixel intensities, noted above in relation to FIG. 1, may be an average intensity of pixels of the predetermined region. This will now be outlined with reference to FIGS. 3A and 3B.

Figure 3A:
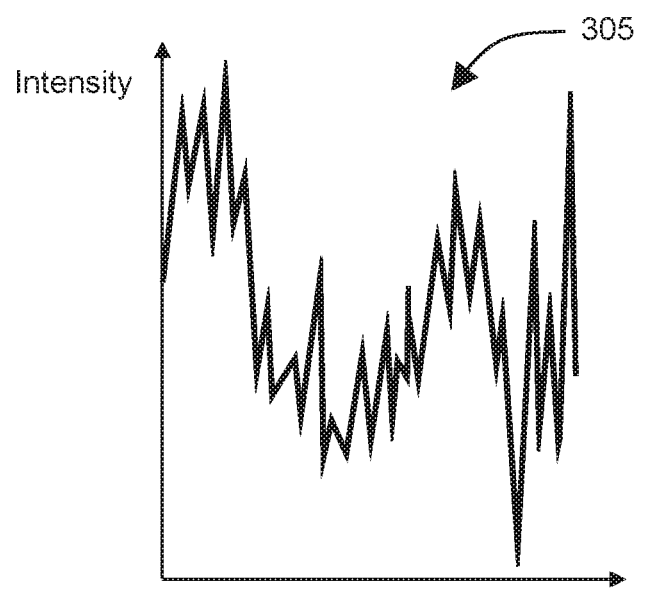
FIGS. 3A, 3B, 4A to 4C and 5 show schematically the characterization of flicker according to examples.

FIG. 3A shows a schematic representation 305 of the profile of intensities of the first pixel of each line of a particular frame. The intensity distribution shows a generally sinusoidal shape as a consequence of banding artefacts. However, the intensity fluctuates around this sinusoid because of local variations in the objects captured in the frame.

Figure 3B:
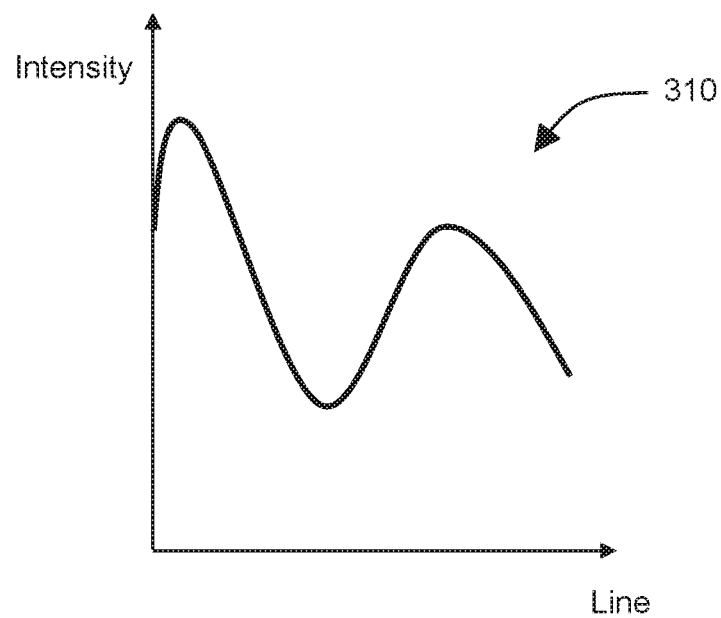

FIG. 3B shows a schematic representation 310 of the profile of the average intensity of the pixels of each line of the same frame. Because each line is captured at the same flicker phase as described above, the local intensity fluctuations are smoothed out by the averaging process. The smooth sinusoid of the flicker is thus more accurately reproduced, which allows the flicker to be more accurately characterized. Furthermore, analysis based on average pixel intensity per line uses less processing, and less storage, the analysis based on individual pixel intensities.

In some video frames, the underlying flicker sinusoid is more difficult to characterize. This will now be outlined with respect to FIGS. 4A to 4C.

Figure 4A:
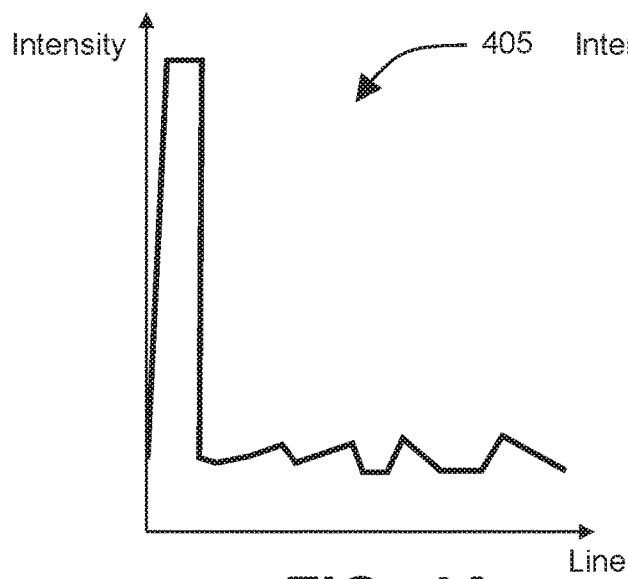

FIG. 4A shows a schematic representation 405 of the profile of intensities of the first pixel of each line of a frame captured with a flickering light source, different from the frame of FIGS. 3A and 3B. The intensities have a fluctuating distribution without an obvious underlying sinusoidal shape.

Figure 4B:
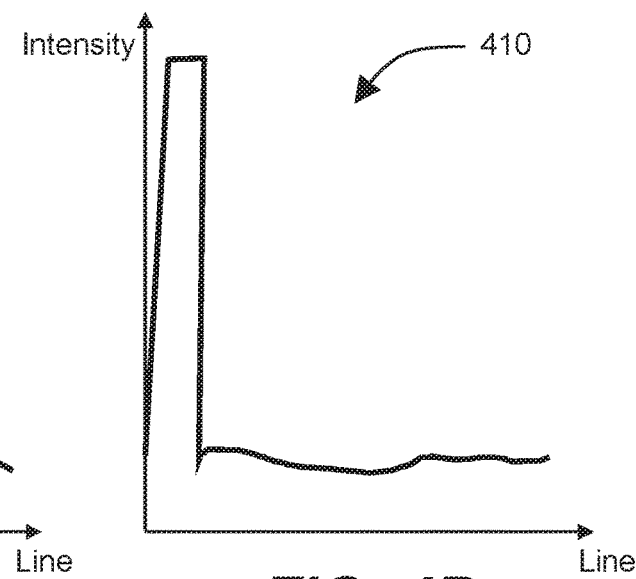

FIG. 4B shows a schematic representation 410 of the profile of the average intensity of the pixels of each line of the frame. As for FIG. 3B, the local intensity fluctuations have been smoothed by the averaging process. However, unlike FIG. 3B, no underlying sinusoid of the flicker is reproduced. This may for example be because the scene captured in the frame of FIGS. 4A and 4B comprised fewer flat surfaces than the scene captured in the frame of FIGS. 3A and 3B, leading to less distinct banding artefacts. However, the flicker may still be visible in the captured video, and so it is desirable to characterize and thereby correct the flicker.

Figure 4C:
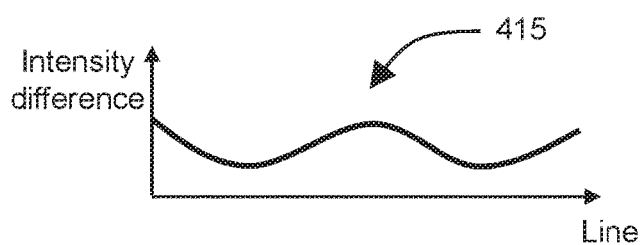

FIG. 4C shows a schematic representation 415 of the difference between the average pixel intensity of each line of the frame of FIGS. 4A and 4B and the average pixel intensity of each line of the frame preceding the frame of FIGS. 4A and 4B. The differences are shown as a line-by-line profile. The profile has a sinusoidal shape corresponding to the sinusoidal flicker oscillation. The underlying sinusoid of the flicker is thus more accurately reproduced by an analysis of the line-by-line change changes between frames than by an analysis of pixel intensity within a single frame because, in the absence of movement between consecutive frames, the difference in average intensities between these frames is caused by the sinusoidal oscillation of the flicker.

The sinusoid of a flicker oscillation can be expressed in the following form as a function of time, t, where A, the amplitude, and θ, the phase, are unknown:

$$A \sin(2\pi t+\theta)$$

This equation can be rewritten as follows, with the unknown constants $A \cos(\theta)$ and $A \sin(\theta)$ being replaced respectively with $r(0)$ and $r(1)$:

$$A \sin(2\pi t+\theta)=A \sin(2\pi t)\cos(\theta)+A \sin(\theta)\cos(2\pi t)$$

$$r(0)=A \cos(\theta)$$

$$r(1)=A \sin(\theta)$$

$$A \sin(2\pi t+\theta)=r(0)\sin(2\pi t)+r(1)\cos(2\pi t)$$

In the equation above, $\sin(2\pi t)$ and $\cos(2\pi t)$ are knowns. In order to solve for the unknowns, $r(0)$ and $r(1)$, the differences between average pixel intensities are determined between three frames.

Figure 5:
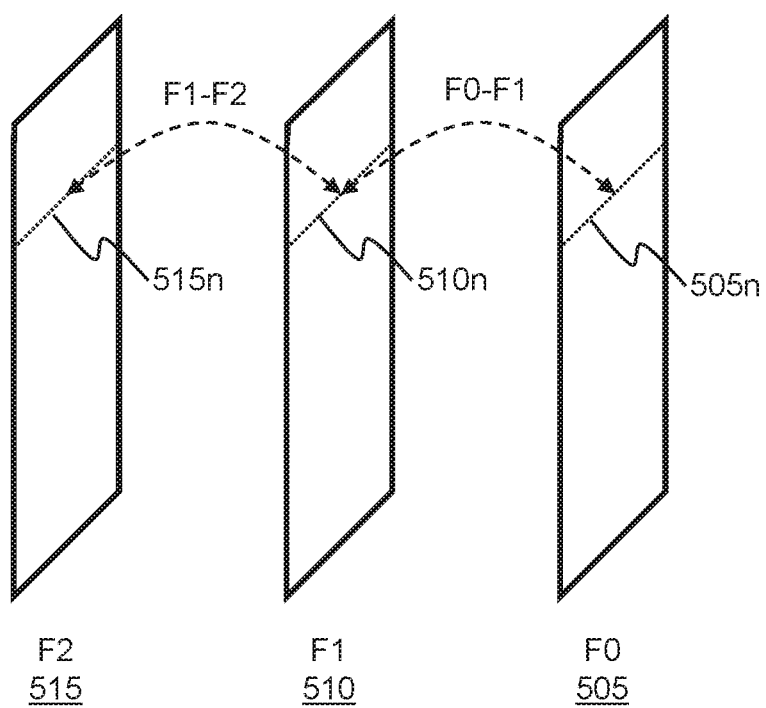

FIG. 5 shows a schematic representation of a sequence of three frames 505, 510, 515. This sequence may for example be the sequence of frames noted above in relation to method 100 in FIG. 1. In other examples, the sequence comprises more than three frames. In FIG. 5, the frames 505, 510, 515 are labelled F0, F1 and F2, respectively. In one example, F0 505 is a current frame, and F1 510 and F2 515 are previous frames. "F0", "F1" and "F2" can be used as a shorthand to refer to pixel intensities is those frames 505, 510, 515.

As described above, the frames 505, 510, 515 can be conceptually divided into lines of pixels. The $n^{th}$ line of each frame 505, 510, 515 is respectively labelled 505$n$, 510$n$, 515$n$. For a given line n, the difference between the average pixel intensities between frame F0 505 and frame F1 510 can be termed F0-F1. Similarly, for the given line n, the difference between the average pixel intensities between frame F1 510 and frame F2 515 can be termed F1-F2.

Returning to the solving for $r(0)$ and $r(1)$ in the equations above, the differences between average pixel intensities between subsequent frames can be expressed as:

$$F0-F1=y(0)=r(0)\sin(2\pi t)+r(1)\cos(2\pi t)$$

$$F1-F2=y(1)=r(0)\sin(2\pi t)+r(1)\cos(2\pi t)$$

These two equations sharing two unknowns can thus be solved as a pair of simultaneous equations, leading to the following expressions for the amplitude and phase of the flicker signal:

$$A^2(\sin^2(\theta)+\cos^2(\theta))=r(0)^2+r(1)^2$$

$$A=\sqrt{r(0)^2+r(1)^2}$$

$$\theta=\arctan2\left(\frac{r(1)}{r(0)}\right)$$

The amplitude A and phase θ can be determined for each line. The amplitude for each line can be divided by the average intensity value of that line to determine an amplitude over signal ratio, M. The amplitude over signal ratio, and phase, can then be averaged over all lines, in order to generate an indication of the underlying flicker sinusoid. The generated sinusoid can be inverted by subtracting it from 1, in order to produce an inverted version of the flicker sinusoid. This inverted version may be termed a correction ratio, CR, which can be expressed as follows:

$$CR=1-M\sin(F0+\theta)$$

The correction ratio can then be used to apply a flicker correction to a frame of the video. For example, the frame can be multiplied line-by-line with the inverted version of the flicker sinusoid described by the correction ratio formula. This multiplication by the inverse of the flicker can effectively cancel, or partially cancel, the flicker sinusoid, thereby reducing or eliminating the flicker artefacts in the frame.

In some examples, the frame to which the flicker correction is applied is one of the sequence of frames based on which the flicker is characterized. For example, with reference to FIG. 5, the flicker correction may be applied to the frame F0 505. In this manner, the flicker can be corrected in a current frame, based on differences between the current frame and two previous frames.

In other examples, the frame to which the flicker correction is applied is subsequent to the sequence of frames based on which the flicker is characterized. For example, with reference to FIG. 5, the flicker correction may be applied to the frame following the frame F0 505. In this manner, the flicker can be characterized based on a current frame and two previous frames, effectively predicting the flicker correction to be applied to the following frame.

In some examples, frames comprise a plurality of zones and the flicker correction method comprises identifying at least one such zone as a flicker-free zone. The flicker correction is then inhibited in the at least one flicker-free zone. For example, the flicker correction may not be applied in the flicker-free zones. Alternatively, the degree of flicker correction may be reduced in the flicker-free zones. Application of flicker correction to parts of a frame that do not exhibit flicker artefacts can cause a reduction in frame image quality. For example, non-flickering parts of a frame may exhibit flicker following application of a flicker correction algorithm. Inhibiting the flicker correction in flicker-free zones in this manner can therefore improve the overall image quality.

In some examples, the zones are rectangular zones. For example, each frame may comprise a grid of such zones. A reduction in zone size can improve the overall image quality, whilst increasing the required processing and storage resources to determine and apply the flicker correction. The zone size can thus be selected as a trade-off between image quality and processing and storage resources. In some examples, the zone size and layout are fixed. In other examples, the zone size and layout are changed dynamically on a video-by-video or frame-by-frame basis.

An example of such zone-based flicker correction will now be described with reference to FIGS. 6A and 6B.

Figure 6A:
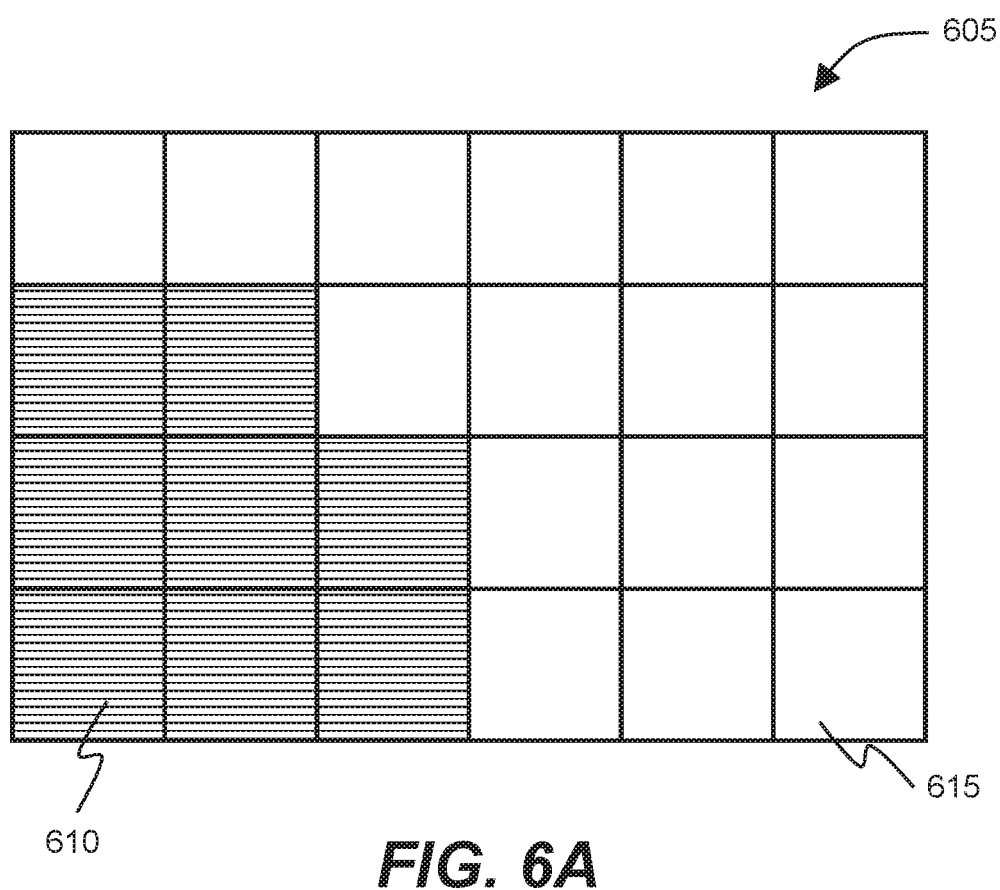
FIGS. 6A and 6B illustrate methods by which the correction applied to zones of an image is determined.

FIG. 6A shows schematically a frame 605 comprising an array of square zones. The zones include zones 610 in which flicker artefacts are present, shown hatched in FIG. 6A. The zones include zones 615 in which no flicker artefacts are present, shown un-hatched in FIG. 5A. For example, this layout of zones 610, 615 may arise from mixed lighting conditions in the scene captured by the frame 605, with flicker zones 610 being illuminated by a flickering light source and flicker-free zones 615 being illuminated by a continuous light source. An example of a continuous light source is daylight. Alternatively, flicker-free zones 615 may be illuminated by a flickering light source with a flicker frequency sufficiently high to cause no flicker artefacts to be present. For example, some types of compact fluorescent lamp and light emitting diode light bulbs operate at such a sufficiently high flicker frequency.

In examples, identifying a given zone as a flicker-free zone 615 comprises determining that a time variation of pixel intensity of the given zone is inconsistent with a presence of flicker in the given zone. The time variation of pixel intensity of a given zone may be a time variation of an average pixel intensity of the same frame. In one such example, an average intensity of each zone 610, 615 is stored for each frame. This average intensity is compared with the average intensity of that zone 610, 615 in the previous frame, to determine the change per zone between frames. The change per zone is then compared to a threshold. If the change in a given zone is higher than the threshold, the zone is identified as a flicker zone 610. If the change in a given zone is lower than the threshold, the zone is identified as a flicker-free zone. The threshold may be selected based on a trade-off between risking falsely identifying a zone as a flicker zone 610 and risking falsely identifying a zone as a flicker-free zone 615.

In some examples, the flicker correction is applied to a varying degree, depending on the change in a given zone. For example, the level of inhibition of the flicker correction may be set on a per-zone basis, such that zones exhibiting a large change, and hence significant flicker artefacts, have a greater degree of flicker correction applied than zones exhibiting smaller changes.

Figure 6B:
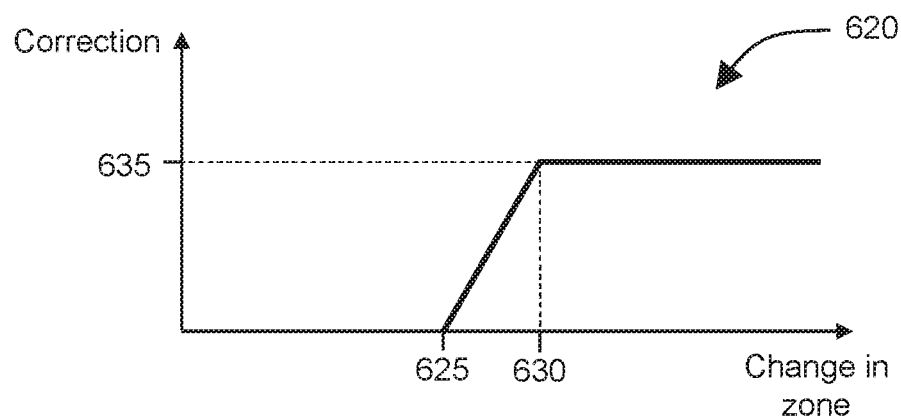

FIG. 6B shows a scheme by which flicker correction can be applied in a varying degree. A graph 620 shows a relationship between a correction applied to a frame and the change in a given zone. If the change in a given zone is below a first threshold 625, no correction is applied to that zone. If the change in a given zone is above a second threshold 630, a maximum correction 635 is applied to that zone. For example, applying the maximum correction 635 may comprise applying a correction ratio as described above. If the change in a given zone is between the first threshold 625 and the second threshold 630, a degree of correction is applied that increases with the change in that zone. This dependence of the degree of correction on the change in a given zone allows the full degree of flicker correction to be applied to zones with significant flicker artefacts, whilst applying a less significant degree of correction to zones with less significant flicker artefacts.

In examples, inhibiting the flicker correction in a given zone comprises identifying an edge region of the given zone and applying a varying degree of flicker correction across the edge region. This can reduce the incidence of blocking artefacts at boundaries between zones that could be caused by a sharp boundary between a zone to which flicker correction is applied and a zone to which no flicker correction is applied. Applying a varying degree of flicker across the edge region may be comprise bi-linearly interpolating the applied degree of flicker correction between a maximum at the center of a flicker zone and a minimum at a border between that flicker zone and a neighboring flicker-free zone.

In examples, flicker-free zones are neglected in the characterizing of the time-varying oscillation of the flicker. For example, the average pixel intensities per line described above may be calculated taking into account flicker zones but not flicker free zones. In some examples such as that of FIG. 6B wherein a varying degree of correction is applied to zones with a change between a first threshold 625 and a second threshold 630, all zones with a change above the threshold 625 are counted as flicker zones and thus taken into account in the characterizing of the time-varying oscillation of the flicker. Neglecting flicker-free zones in this manner improves the accuracy of the characterization of the flicker and also reduces the processing resources for performing the characterization.

Examples of the present disclosure may be implemented to reduce flicker in single exposure video and also in high dynamic range (HDR) video. In an HDR video, each frame is produced from multiple captured images, each captured image having a different exposure. The term "exposure" is used herein to refer to the sensitivity of a captured image to incident light. Exposure can be varied by changing parameters of a video recording device such as a video camera or smartphone. For example, exposure may be reduced by reducing the length of time that light is incident on an image sensor, for example by increasing the speed at which the image sensor is scanned in a "rolling shutter" capture. This may be termed the integration time. Another example of such a parameter is the analogue and/or digital gain of the image sensor, which expresses the sensitivity of the sensor to light. A third example of such a parameter is the focal ratio, or "f-stop". The exposure of an image may be expressed as a function of at least one of these parameters, for example as a single value expressing the overall sensitivity to light. For example, doubling the gain of the image sensor and halving the integration time may have no net effect on the exposure. A combination of settings resulting in a higher sensitivity to light may be termed a greater exposure, and a combination of settings resulting in a lower sensitivity to light may be termed a smaller exposure. As is common in the art, the term "exposure" may also be used to refer to an image with a particular exposure value.

An HDR frame represents a wider dynamic range of luminosity than is typically possible without using HDR techniques. One technique for producing such a frame is to capture multiple component frames in succession, each having a different exposure, and then to combine or "stitch" these into a single HDR frame. For example, a capture with a greater exposure is more sensitive to details in areas of low light, but saturated in brighter areas, whereas a capture with a smaller exposure is more sensitive to details in areas of bright light, but exhibits loss of detail in dark areas. An HDR frame can thus be formed by combining darker regions of the capture with greater exposure with brighter regions of the capture with smaller exposure.

Figure 7:
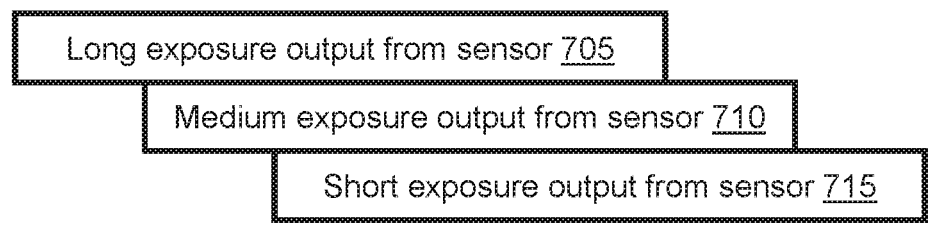
FIG. 7 illustrates the capturing of high dynamic range video.

FIG. 7 shows schematically the capture of high dynamic range frame components, each component having a different exposure, according to an example.

A long exposure 705 is captured and read out from a sensor. This readout is a line-by-line rolling shutter readout as described above. A medium exposure 710 is then captured and read out from the sensor. In some examples, as shown, the readout of the medium exposure 710 begins before the readout of the long exposure 705 has finished. This may be termed digital overlap operation. In digital overlap operation, when a given exposure is not being read out, a blanking interval may be read out instead. In other examples, the readout of the medium exposure 710 begins after the long exposure has finished. A short exposure 715 is then captured and read out from the sensor. As for the medium exposure 710, the readout of the short exposure 715 may overlap in time with the readout of the long exposure 705 and/or the readout of the medium exposure 710. Alternatively, the readout of the short exposure 715 may not overlap with the readout of the long exposure 705 and/or medium exposure 710.

Once all three exposures 705, 710, 715 have been read out, the process begins again for the next frame. There may be a vertical blanking interval following readout of the three exposures 705, 710, 715 of one frame, before the exposures of the next frame are read out. In one such example, three HDR frame components with different exposure are read out over a time corresponding to four non-HDR frames. Thus, a sensor configured to capture 120 non-HDR frames per second could capture 30 HDR frames per second.

In one such example the sequence of frames, based on which the flicker is characterized, comprises frames having a given exposure. An HDR frame is then produced, for which the frame to which flicker correction is applied is an HDR component. The other HDR frame components may also be frames for which flicker is corrected according to methods described herein. An HDR frame can thus be produced based on multiple component captures, for each of which flicker correction has been performed. Certain other flicker correction techniques, such as adjusting the capture time of each frame to be at the same phase of the flicker, may not be suitable for use with HDR video. The present technique allows flicker correction to be performed for HDR video, thereby improving the quality of HDR frames compared with frames for which such flicker correction is not performed.

Figure 8:
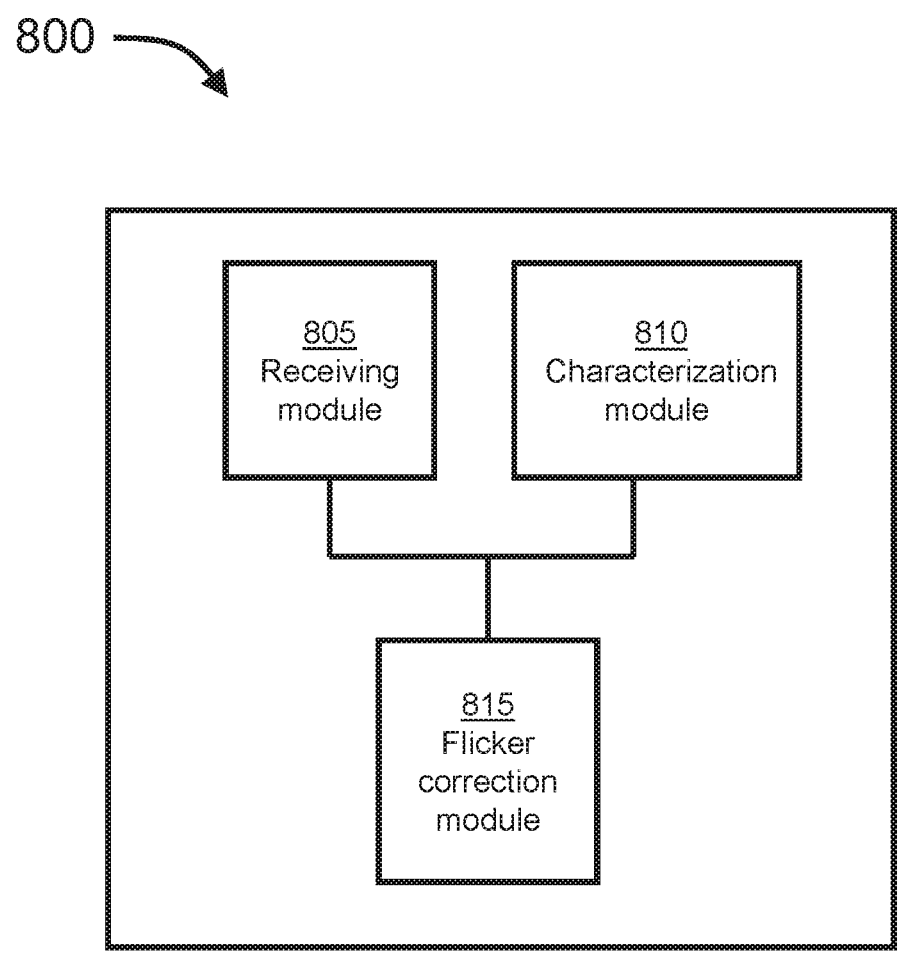
FIG. 8 shows schematically an apparatus according to an example.

FIG. 8 shows schematically an apparatus 800 for reducing artefacts caused by the presence of flicker during capture of a video, for example by implementing methods as described herein. The apparatus comprises modules. These modules may be implemented in hardware, software or a combination thereof.

The apparatus 800 comprises a receiving module 805 to capture a sequence of frames of the video. The frames each comprise a plurality of predefined regions, each region comprising a plurality of pixels.

The apparatus 800 comprises a characterization module 810 to characterize a time-varying oscillation of the flicker based on variations, across the sequence of frames, of data relating to pixel intensities in at least one said region.

The apparatus 800 comprises a flicker correction module 815 to, based on the characterizing of the time-varying oscillation of the flicker, apply a flicker correction to a frame of the video.

Figure 9:
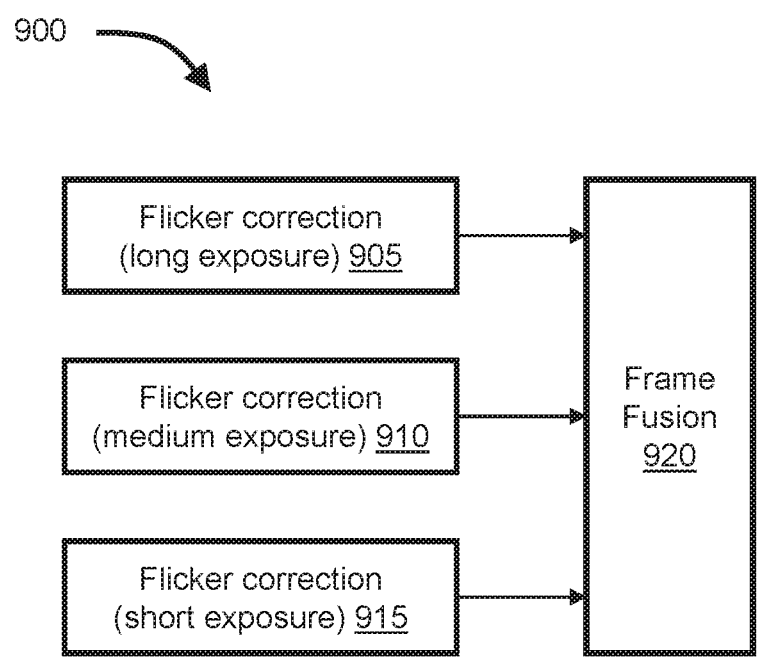
FIG. 9 shows schematically an architecture for producing high dynamic range video.

In some examples, as noted above, multiple exposures are combined to form a single HDR frame. FIG. 9 shows schematically an architecture 900 for combining exposures in this manner.

A long exposure is received at a long exposure flicker correction block 905. A medium exposure is received at a medium exposure flicker correction block 910. A short exposure is received at a short exposure flicker correction block 915. The multiple flicker correction blocks 905, 910, 915 perform flicker correction on their respective received exposures. The flicker correction blocks 905, 910, 915 may for example be multiple instances of the same hardware flicker correction block.

The architecture 900 further comprises a frame fusion block 920. The frame fusion block 920 receives flicker-corrected long, medium and short exposures from the flicker correction blocks 905, 910, 915 and combines them to form an HDR frame as described above.

Figure 10A:
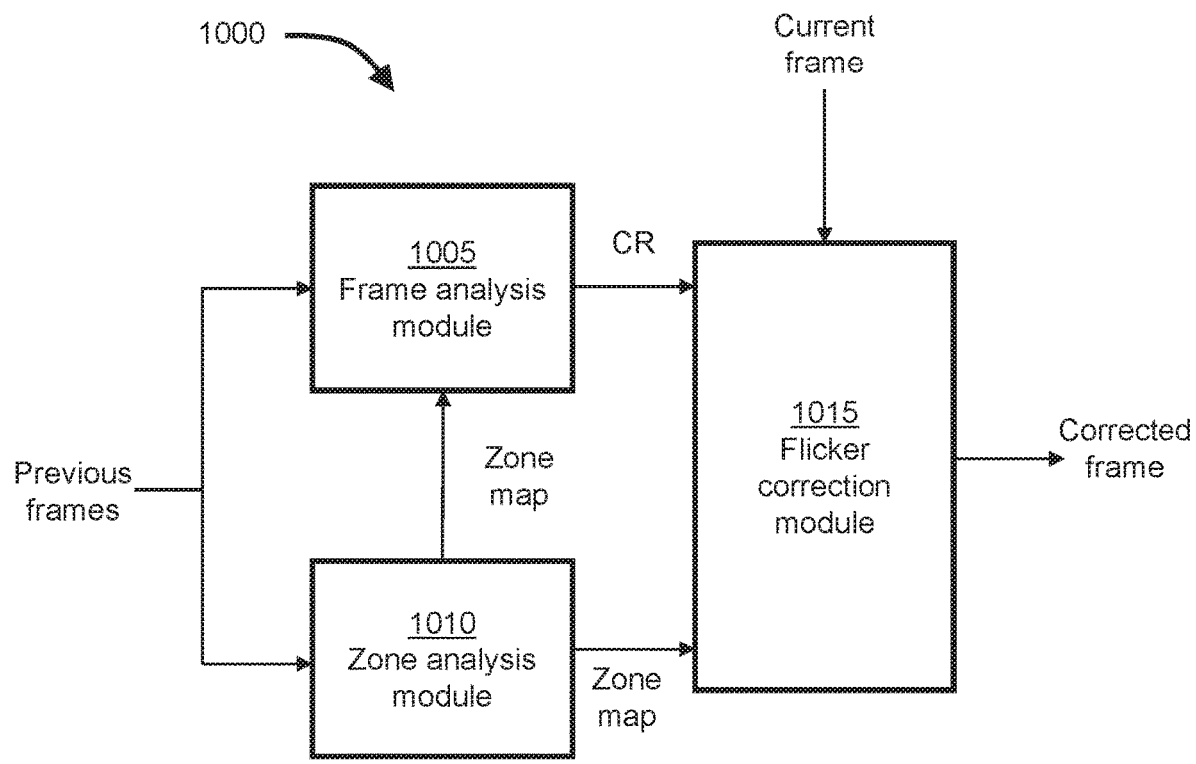
FIGS. 10A and 10B show schematically an apparatus according to an example.

FIG. 10 shows schematically an example apparatus 1000 for performing flicker correction. The apparatus comprises a frame analysis module 1005, a zone analysis module 1010 and a flicker correction module 1015.

The zone analysis module 1010 receives data describing pixel intensities in previous frames. The zone analysis module 1010 uses this data to calculate the change in pixel intensity per zone as described above. The change in each zone is compared with thresholds as described above in relation to FIG. 6B. A zone map describing whether the change in each zone is higher or lower than each threshold is provided to the frame analysis module 1005 and to the flicker correction module 1015.

The frame analysis module 1005 receives the data describing pixel intensities in previous frames. The frame analysis module 1005 also receives the zone map from the zone analysis module 1010. Based on these inputs, the frame analysis module 1005 determines the amplitude and phase of the flicker, with serial calculations on a line-by-line basis, as described in more detail above. The frame analysis module 1005 then calculates the flicker correction ratio (CR) to apply to the current frame, and provides this to the flicker correction module 1015.

The flicker correction module 1015 receives the correction ratio from the frame analysis module 1005 and the zone map from the zone analysis module 1010. The flicker correction module 1015 also receives data describing the current frame. The flicker correction module 1015 then corrects the flicker in the current frame, for example as described in more detail above, and outputs a corrected frame. In examples, the flicker correction is performed on a pixel-by-pixel basis, with a rate of one pixel per clock cycle.

In some implementations of the apparatus 1000, the frame analysis module 1005 and the zone analysis module 1010 comprise memories, for example to store the previous frame data. Conversely, the flicker correction module 1015 may be purely combinatorial and comprise no memory other than pipelining registers.

Figure 10B:
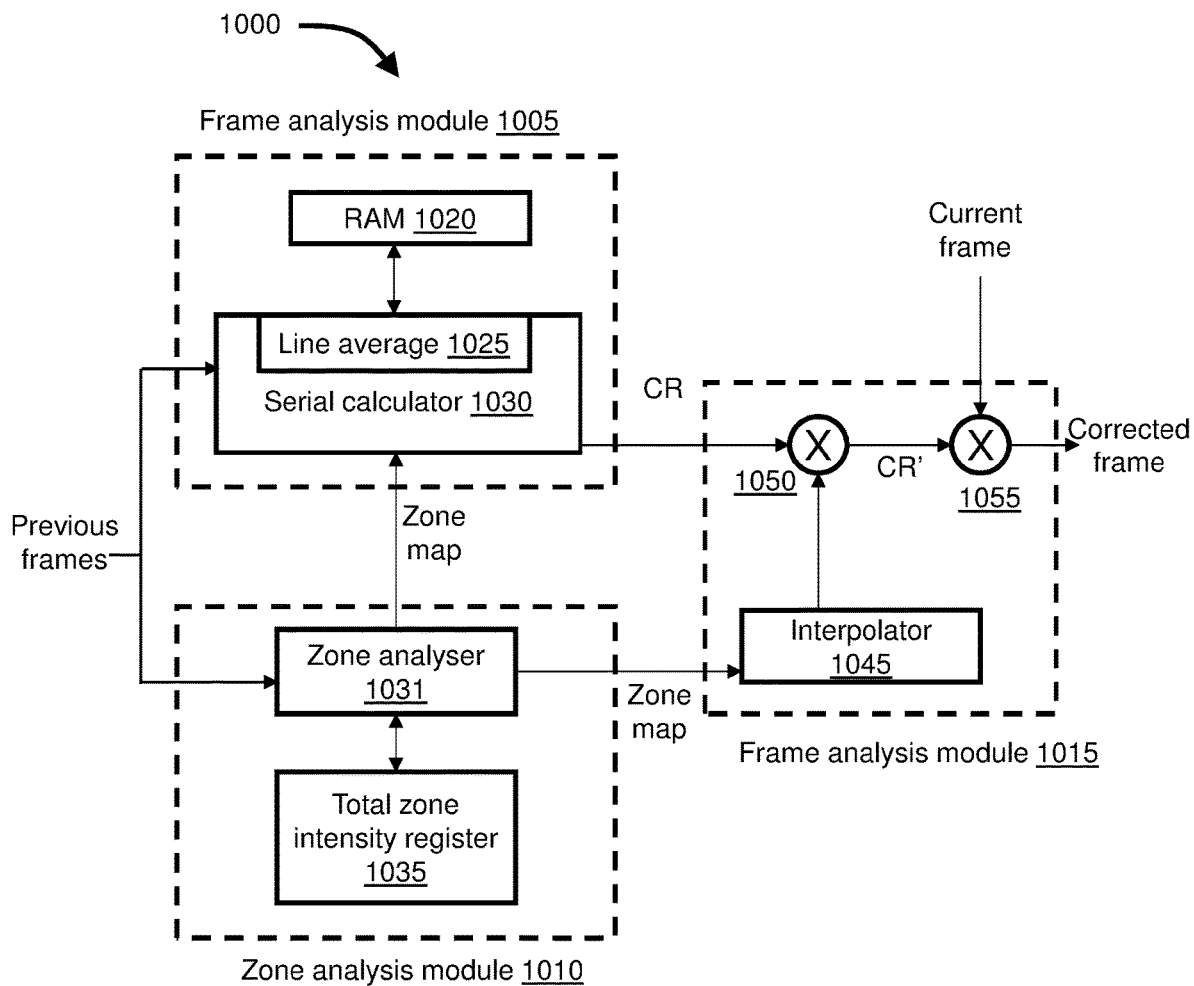

FIG. 10B shows schematically a more detailed version of an implementation of the apparatus 1000.

The frame analysis module 1005 comprises a random-access memory, RAM 1020, for storing the line-by-line pixel intensity averages of the previous two frames. The RAM 1020 may for example be a static RAM (SRAM). The frame analysis module 1005 further comprises a line averaging module 1025 to receive the pixel-by-pixel intensity data and determine the per-line average. This may for example be implemented by way of an accumulator, which is active when receiving a line. A serial multiplier and a serial divider may be used to normalize the line average value, such that correction ratios can be accurately calculated for lines crossing different numbers of flicker zones. The line averaging module 1025 stores the average intensity of a given line in the RAM 1020. The RAM 1020 may for example comprise two halves operating as ping-pong buffers, such that the average pixel intensities of subsequent frames are stored in alternating halves of the RAM 1020.

Figure 11:
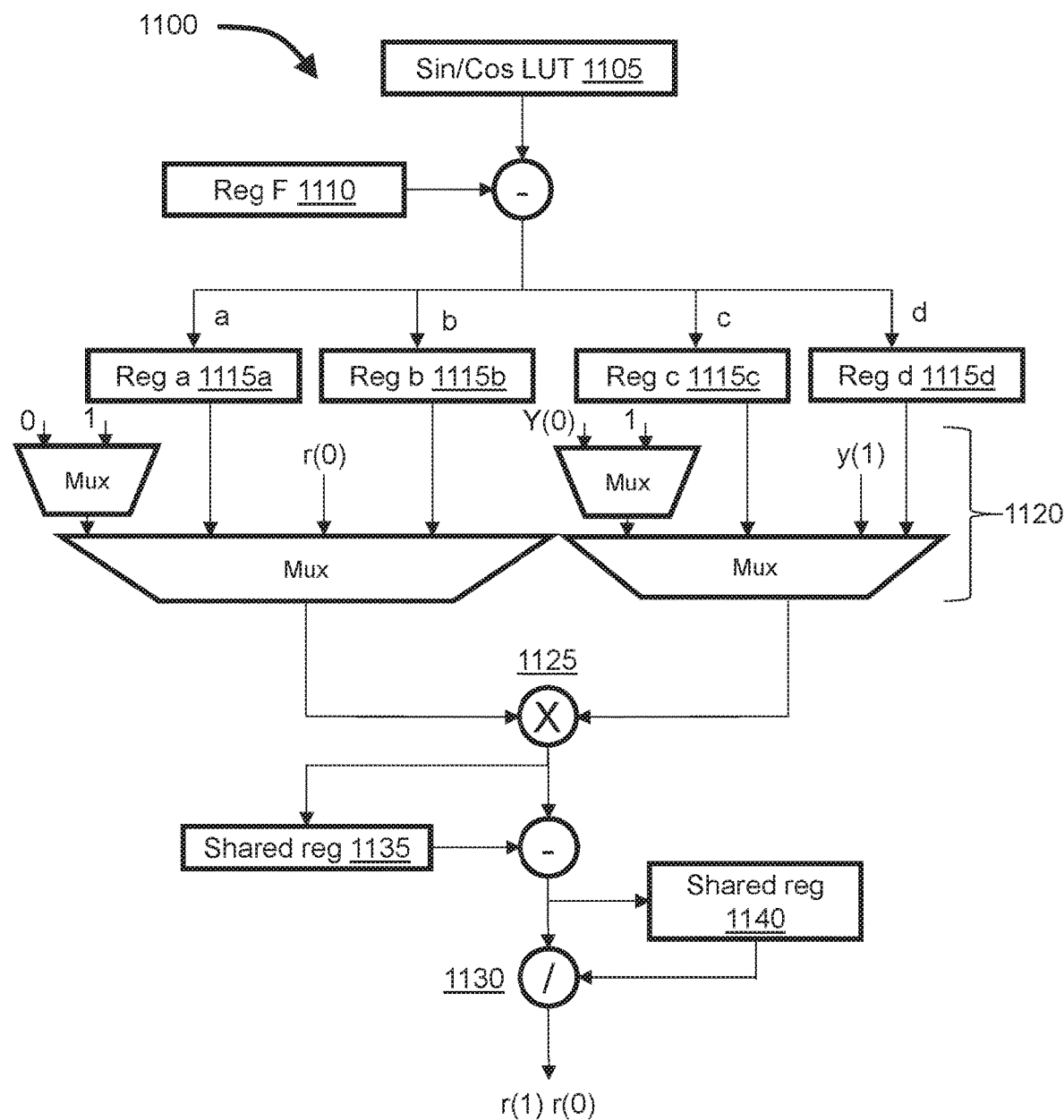
FIGS. 11 and 12 illustrate an example architecture of components of an apparatus.

The line averaging module 1025 is associated with a serial calculator 1030 for calculating flicker amplitude and phase. FIG. 11 shows schematically an example architecture 1100 of such a serial calculator 1030.

A sine and cosine lookup table, LUT, is used to determine line-specific sine and cosine values for three consecutive frames F0, F1 and F2. Specifically, the following values are calculated:

$$\sin F1, \sin F2, \sin F0, \sin F1, \cos F1, \cos F2, \cos F0, \cos F1$$

The first, third, fifth and seventh of these are stored in register F 1110. These are then used to determine and store the results of the following calculations in registers a, b, c and d 1115a-d:

$$\sin F1 - \sin F2 = a$$

$$\sin F0 - \sin F1 = c$$

$$\cos F1 - \cos F2 = b$$

$$\cos F0 - \cos F1 = d$$

These values are then multiplexed by multiplexers (Mux) 1120 and used to calculate r(0) and r(1) as defined above. r(0) can be expressed as follows:

$$ar(0) + br(1) = y(0)$$

$$r(0) = \frac{y(0) - br(1)}{a}$$

r(0) can then be replaced with r(1) as follows:

$$cr(0) + dr(1) = y(1)$$

$$r(1) = \frac{y(1) - cr(0)}{d}$$

$$r(1) = \frac{ay(1) - cy(0)}{ad - cb}$$

In this manner, r(0) and r(1) can be determined. The multiplications and divisions in the equations above are performed by a serial multiplier 1125 and a serial divider 1130, with intermediate values being stored in shared registers 1135, 1140.

Figure 12:
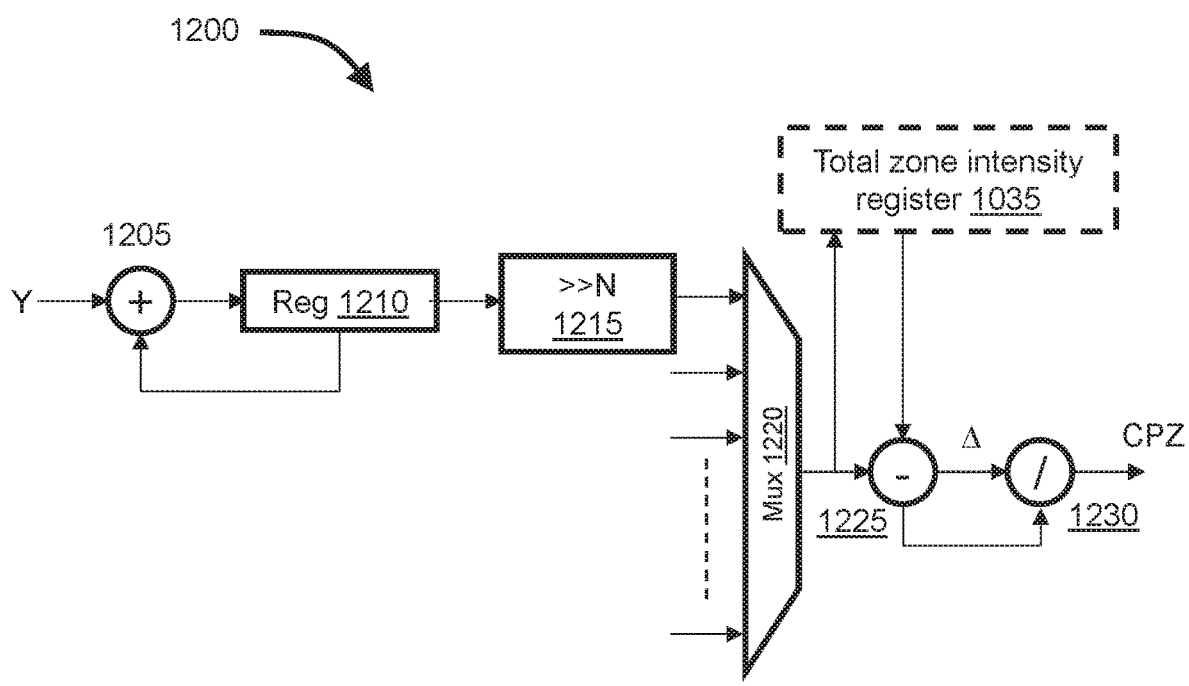

Returning to FIG. 10B, the zone analysis module 1010 comprises a zone analyzer 1031 and a register 1035 for storing the total intensity for each zone. FIG. 12 shows schematically an example architecture 1200 for the zone analyzer 1031.

Pixel intensity values, Y, are received at accumulators 1205, with the architecture 1200 comprising one accumulator 1205 for each column of zones in a frame (for clarity, a single accumulator 1205 is shown in FIG. 12). For example, if a given frame comprises 8 columns of zones, the architecture 1200 comprises 8 accumulators 1205. The accumulated pixel intensities from a given accumulator 1205 are stored in a register 1210. When the pixel intensities of an entire zone have been accumulated in the register 1210, the accumulated value is shifted to the right by N bits in shifter 1215. N is an arbitrary number depending on the resolution of the input frames. This shifting is effectively equivalent to a division by 2N. Shifted values for each column of zones are multiplexed by multiplexer 1220 and stored in the total zone intensity register 1035. The register 1035 may alternatively be a RAM such as an SRAM.

The zone intensity for the current zone of the current frame is subtracted, at subtractor 1225, from the intensity value of the corresponding zone of the previous frame. This difference, A, is divided at divider 1230 by the intensity value of the current zone, to produce the absolute change in the current zone. This value, referred to above as the change per zone (CPZ), is output to be compared with threshold for applying flicker correction as described above in relation to FIG. 6B.

Returning to FIG. 10B, the flicker correction module 1015 comprises an interpolator 1045 that receives the zone map from the zone analyzer 1031 of the zone analysis module 1010 and determines weightings to apply to the correction ratio, in particular if the change in a given zone lies is such that the flicker correction is to be applied to a reduced degree as described above with reference to FIG. 6B. In one example, the interpolator 1045 comprises three multipliers. In some examples, power is saved by clock gating the interpolator 1045 if the same correction is to be applied to neighbouring zones. These weightings are multiplied, at multiplier 1050, with the correction ratios received from the serial calculator 1030 of the frame analysis module 1005, to produce a weighted correction ratio CR'. This weighted correction ratio is applied to the current frame at multiplier 1055, which outputs the corrected frame.

Figure 13:
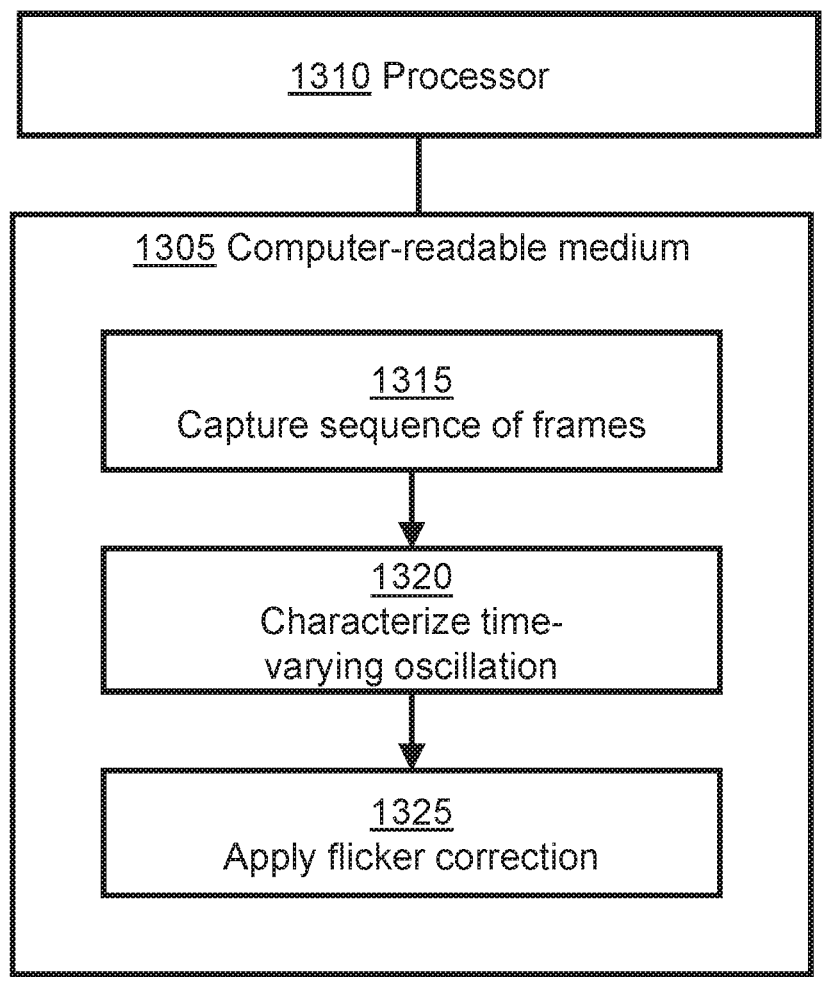
FIG. 13 shows schematically a computer-readable storage medium according to an example.

FIG. 13 shows an example of a non-transitory computer-readable storage medium 1305 comprising a set of computer readable instructions which, when executed by at least one processor 1310, cause the at least one processor 1310 to perform a method according to examples described herein. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 1315, the instructions cause the processor 1310 to capture a sequence of frames of a video. The frames each comprise a comprise a plurality of predefined regions, each comprising a plurality of pixels.

At block 1320, the instructions cause the processor 1310 to characterize a time-varying oscillation of flicker present during capture of the video. The characterizing is based on variations, across the sequence of frames, of data relating to pixel intensities in at least one said region.

At block 1325, the instructions cause the processor 1310 to, based on the characterizing of the time-varying oscillation of the flicker, apply a flicker correction to a frame of the video.

The above embodiments are to be understood as illustrative examples of the invention. Further embodiments of the invention are envisaged. For example, it is described above that the regions based on which the flicker is characterized may be lines of pixels. In other embodiments, the regions may be single pixels, or segments of lines of pixels, or larger blocks of pixels. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for reducing artefacts caused by the presence of flicker during capture of a video, the method comprising:
    capturing a sequence of frames of the video, the frames each comprising a plurality of predefined regions each comprising a plurality of pixels;
    characterizing a time-varying oscillation of the flicker based on variations, across the sequence of frames, of data relating to pixel intensities in at least one said predefined region, wherein characterizing the time-varying oscillation of the flicker comprises determining an amplitude and a phase of the flicker, and generating a sinusoid indicative of the flicker using the amplitude and the phase of the flicker; and
    based on the characterizing of the time-varying oscillation of the flicker, applying a flicker correction to a frame of the video, wherein applying the flicker correction comprises inverting the generated sinusoid to generate a correction ratio, and using the correction ratio to apply the flicker correction to the frame of the video.

2. A method according to claim 1, wherein:
    the method comprises determining a frequency of the flicker; and
    the characterizing of the time-varying oscillation of the flicker is based on the determined frequency.

3. A method according to claim 2, wherein the determining of the frequency of the flicker is based on a geographical location at which the video was captured.

4. A method according to claim 1, wherein the frame to which the flicker correction is applied is one of the sequence of frames.

5. A method according to claim 1, wherein the frame to which the flicker correction is applied is subsequent to the sequence of frames.

6. A method according to claim 1, wherein the sequence of frames comprises at least three frames.

7. A method according to claim 1, wherein:
    the video is captured using a rolling shutter; and
    each said predetermined region comprises a line of pixels.

8. A method according to claim 1, wherein the data relating to pixel intensities is an average intensity of pixels of the predetermined region.

9. A method according to claim 1, wherein:
    the sequence of frames comprises frames having a given exposure; and
    the method comprises producing a high dynamic range frame for which the frame to which flicker correction is applied is a high dynamic range frame component.

10. A method according to claim 1, wherein the frames comprise a plurality of zones, the method comprising:
    identifying at least one said zone as a flicker-free zone; and
    inhibiting the flicker correction in the at least one flicker-free zone.

11. A method according to claim 10, wherein:
    the at least one flicker-free zone is neglected in the characterizing of the time-varying oscillation of the flicker.

12. A method according to claim 10, wherein identifying a given zone as a flicker-free zone comprises determining that a time variation of pixel intensity of the given zone is inconsistent with a presence of flicker in the given zone.

13. A method according to claim 12, wherein the time variation of pixel intensity of a given zone is a time variation of an average pixel intensity of the given zone.

14. A method according to any of claim 10, wherein inhibiting the flicker correction in a given zone comprises:
    identifying an edge region of the given zone; and
    applying a varying degree of flicker correction across the edge region.

15. An apparatus for reducing artefacts caused by the presence of flicker during capture of a video, the apparatus comprising:
    a receiving module to capture a sequence of frames of the video, the frames each comprising a plurality of predefined regions each comprising a plurality of pixels;
    a characterization module to characterize a time-varying oscillation of the flicker based on variations, across the sequence of frames, of data relating to pixel intensities in at least one said predefined region, wherein characterizing the time-varying oscillation of the flicker comprises determining an amplitude and a phase of the flicker, and generating a sinusoid indicative of the flicker using the amplitude and the phase of the flicker; and
    a flicker correction module to, based on the characterizing of the time-varying oscillation of the flicker, apply a flicker correction to a frame of the video, wherein applying the flicker correction comprises inverting the generated sinusoid to generate a correction ratio, and using the correction ratio to apply the flicker correction to the frame of the video.

16. A non-transitory computer-readable storage medium comprising a set of computer-readable instructions stored thereon which, when executed by at least one processor, cause the at least one processor to:
    capture a sequence of frames of a video, the frames each comprising a plurality of predefined regions each comprising a plurality of pixels;
    characterize a time-varying oscillation of flicker present during capture of the video, the characterizing being based on variations, across the sequence of frames, of data relating to pixel intensities in at least one said predefined region, wherein characterizing the time-varying oscillation of the flicker comprises determining an amplitude and a phase of the flicker, and generating a sinusoid indicative of the flicker using the amplitude and the phase of the flicker; and
    based on the characterizing of the time-varying oscillation of the flicker, apply a flicker correction to a frame of the video, wherein applying the flicker correction comprises inverting the generated sinusoid to generate a correction ratio, and using the correction ratio to apply the flicker correction to the frame of the video.

17. A method for reducing artefacts caused by the presence of flicker during capture of a video, the method comprising:

capturing a sequence of frames of the video, the frames each comprising a plurality of predefined regions each comprising a plurality of pixels;

characterizing a time-varying oscillation of the flicker based on variations, across the sequence of frames, of data relating to pixel intensities in at least one said predefined region, wherein characterizing the time-varying oscillation of the flicker comprises determining an amplitude and a phase of the flicker; and based on the characterizing of the time-varying oscillation of the flicker, applying a flicker correction to a frame of the video, wherein the frame comprises a plurality of zones, and the method comprises identifying at least one of said zones as a flicker-free zone, and inhibiting the flicker correction in the at least one flicker-free zone.

* * * * *